Jan. 28, 1941.  S. PITT ET AL  2,229,988
CONTROL APPARATUS
Filed Oct. 8, 1937  3 Sheets-Sheet 1

INVENTORS
S. PITT
L. O. REICHELT
BY
E. R. Nowlan
ATTORNEY

Jan. 28, 1941.   S. PITT ET AL   2,229,988
CONTROL APPARATUS
Filed Oct. 8, 1937   3 Sheets-Sheet 2
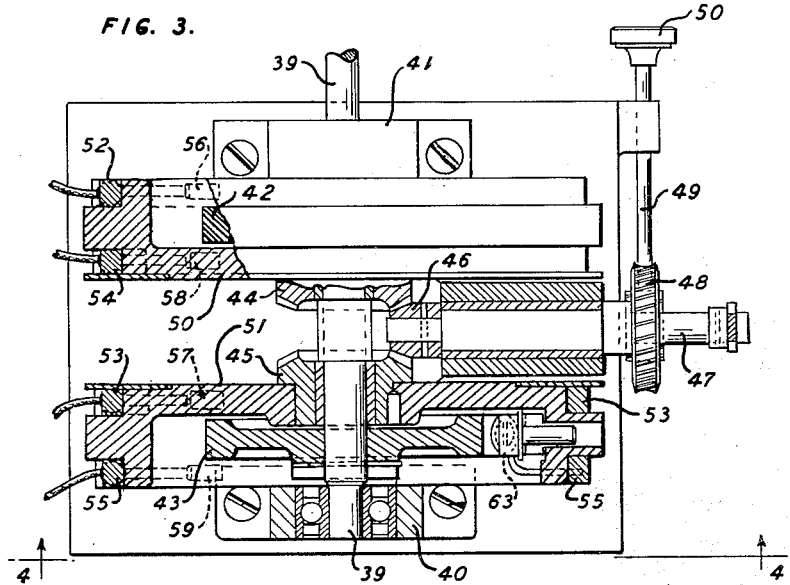
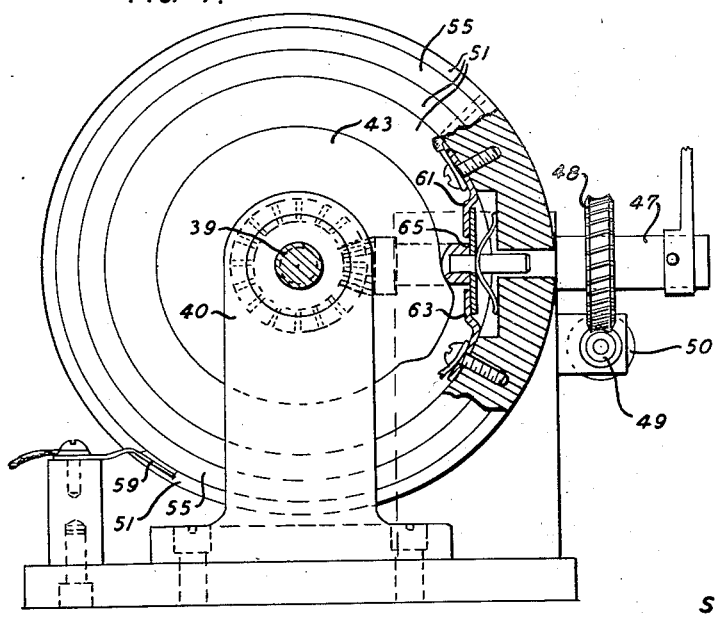
INVENTORS
S. PITT
L. O. REICHELT
BY
E. R. Nowlan
ATTORNEY

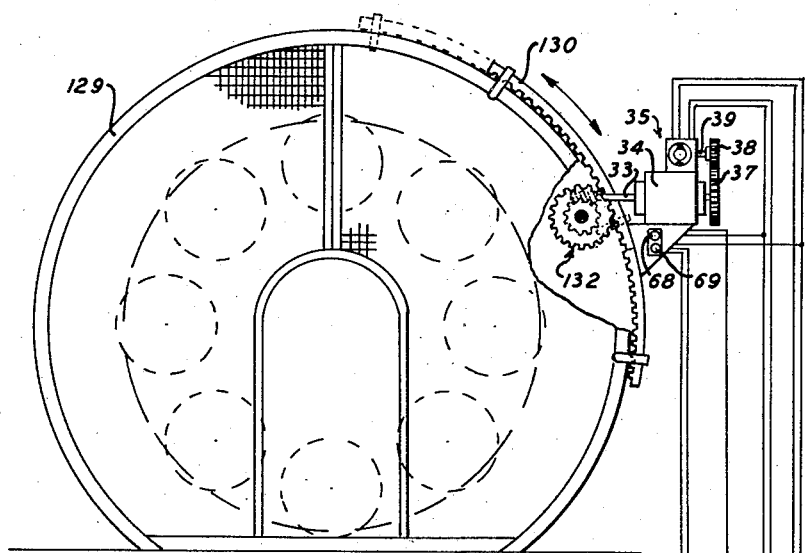
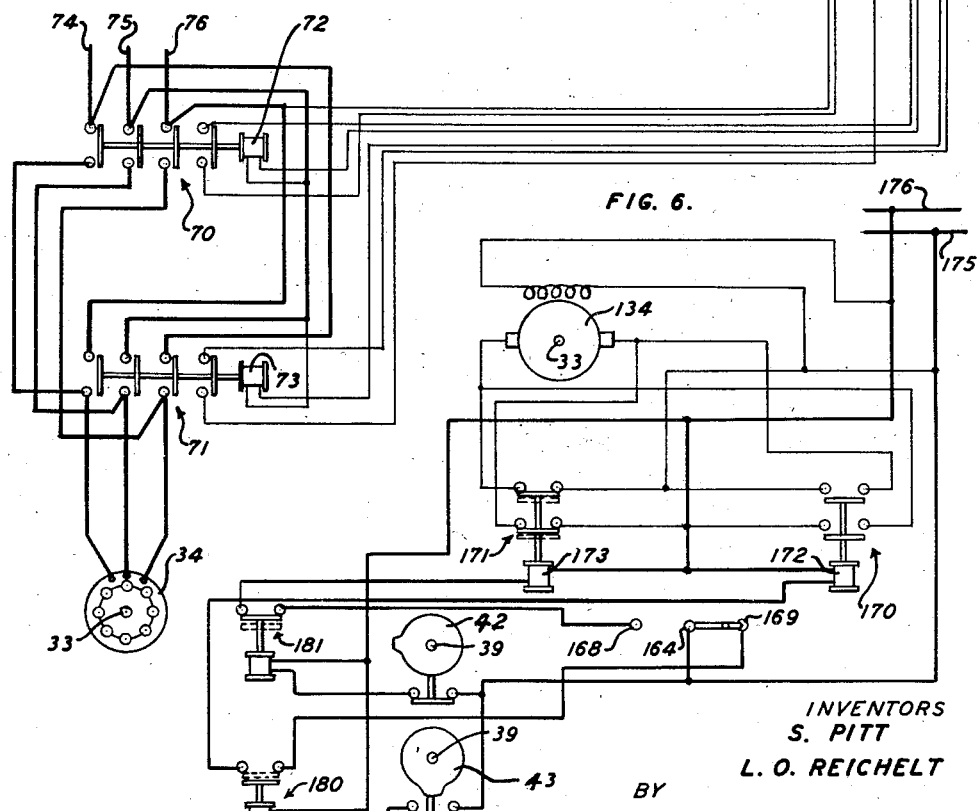

Patented Jan. 28, 1941

2,229,988

UNITED STATES PATENT OFFICE 2,229,988

CONTROL APPARATUS

Samuel Pitt, Westfield, and Lester O. Reichelt, Cranford, N. J., assignors to Western Electric Company, Incorporated, New York, N. Y., a corporation of New York Application October 8, 1937, Serial No. 168,030

15 Claims. (Cl. 172—240)

This invention relates to control apparatus and more particularly to a control apparatus for governing the to and fro motion of reciprocating elements, especially in heavy and powerful strand handling machinery.

In the manufacture of cable of various kinds, both that for mechanical uses and that for electrical conduction, apparatus and machines are used having parts or elements which require to be driven in to and fro motion, either in continuously recurrent cycles or in single cycles at will, with accurate control of excursion to and fro.

An object of the present invention is to provide accurate and reliable means to control the to and fro motion of a reciprocatory member.

With the above and other objects in view, one embodiment of the invention contemplates the combination with a member to be driven in cyclically repeated to and fro reciprocation and variable means to drive the member, of an electric motor to effect variation of the variable driving means, switches actuable by the reciprocable member at the limits of its excursion to automatically control the motor, and manually operable switches to control the motor at will.

Other objects and features of the invention will appear from the following detailed description of two embodiments thereof taken in connection with the accompanying drawings in which the same reference numerals are applied to identical parts in the several figures and in which Fig. 1 is a partly diagrammatic view in elevation of a distributor mechanism for use in strand handling apparatus and constructed in accordance with the invention;

Fig. 3 is an enlarged detached plan view partly in section of the adjustable rotary cam control device;

Fig. 4 is an elevational view thereof partly in section;

Fig. 5 is a diagrammatic end view of a cabling machine in which the invention is embodied in another form, and Fig. 6 is a wiring diagram for a modified form of Fig. 5.

Figure 1:
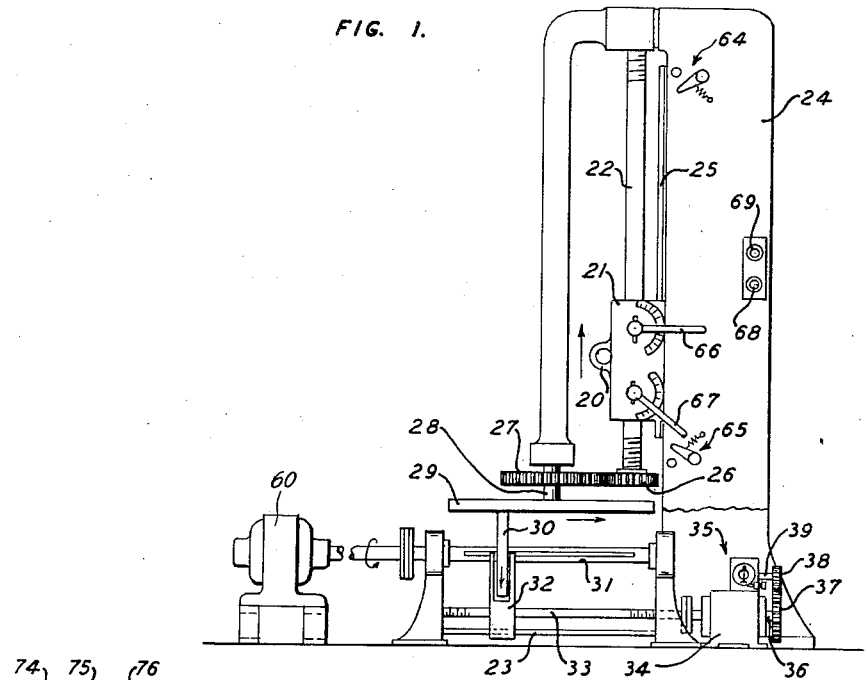

The embodiment shown in Figs. 1, 2, 3 and 4 discloses the invention applied in the control of a distributor mechanism as used in many strand combining apparatus. In the present instance it may be assumed that a cable or other strand coming from some strand handling apparatus, not shown, passes through a guide member 20 and thence to a vertically disposed take-up reel, also not shown, to be wound thereon. Function of the guide member 20 is to carry the cable or strand up and down to distribute it in even, closely wound layers on the reel.

The guide 20 is mounted on a nut 21 which is driven up or down by a threaded shaft 22 rotatably supported in a stationary frame or standard 24 mounted on the floor or other suitable support. A guide rail 25 engages the nut 21 slidably in a notch or perforation in the nut to keep the nut from rotating.

A gear 26 rigid on the shaft 22 is driven by a gear 27 rigid on a shaft 28 suitably mounted to rotate on the frame or support 24. The shaft 28 is driven by a friction disc 29 secured on the lower end of the shaft 28, and the disc 29 is driven in turn at variable speed and in either direction by a coacting disc 30 whose periphery runs against the flat under face of the disc 29 and in contact with that face always at some point of a diameter thereof.

The disc 30 is mounted on a longitudinally slotted shaft 31 which lies below and diametrically across the under face of the disc 29. The disc 30 is longitudinally slidable on the shaft 31 but is compelled to rotate therewith by a key or stud on the disc 30 extending into the slot of the shaft 31.

The shaft 31 is driven by some power means 60 to run at constant rotational speed and thus drives the shaft 22 in a direction and at a speed depending upon the position of the disc 30 on the shaft 31 relative to the disc 29.

The disc 30 may be shifted along the shaft 31 by means of a yoke 32 whose arms lie one on each side of the disc 30 and whose body is mounted on and reciprocated by a threaded shaft 33 rotatably mounted parallel to the shaft 31 in appropriate supports. The yoke 32 is kept from rotation on the shaft 33 by a guide rod 23.

The shaft 33 may be driven, to shift the yoke 32 and thereby the disc 31, by a motor 34, here shown as a three phase, induction, squirrel cage motor, but which may be of any suitable construction. The motor 34 is here shown for simplicity as directly connected to the shaft 33, but suitable reduction gearing may be interposed between the motor and the shaft if desired.

A control device, generally indicated at 35 and shown on an enlarged scale and in detail in Figs. 3 and 4, may be conveniently mounted on the motor 34, as shown in Fig. 1, to be driven by the motor through suitable gears 37 on the motor shaft 36 and 38 on the control device shaft 39. In Figs. 3 and 4, the control device is shown with the housing removed, which housing appears in Fig. 1.

The shaft 39 (see now Figs. 3 and 4) is journalled in antifriction bearings in a pair of supports 40 and 41, and has keyed or pinned to it a pair of identical rotary cams 42 and 43 preferably of insulating material such as hard fibre. A pair of symmetrically identical bevel gears 44 and 45 is mounted on the shaft 39 to be independently freely rotatable thereon and both engage with a bevel gear 46 pinned to a shaft 47 journalled to stand at right angles to the shaft 39. A worm gear 48 is also secured on the shaft 47 and engages with a worm shaft 49 having a knurled head 50 by manipulation of which the shaft 49, worm gear 48, shaft 47 and bevel gear 46 may be actuated to rotate the gears 44 and 45 to adjust the relative angular position of these last two gears with respect to each other.

Identically symmetrically similar discs 50 and 51 are mounted on and keyed to the gears 44 and 45 respectively to be rotated by the gears. Disc 51 has a peripheral lateral flange with two peripheral grooves in which are positioned metal slip ring contacts 53 and 55, which are electrically engaged by fixed position spring contacts 57 and 59 respectively. On the inside of the flange of disc 51 is mounted a pair of spaced contacts 61 and 63 of which 61 is connected to ring 53 and 63 to ring 55. A spring pressed push button contact 65 is also mounted on the flange of the disc 51 in position to normally connect contact 61 to contact 63, and to be moved exceptionally by the cam 43 to break a circuit from 61 to 63.

Similar parts mounted on the disc 50 enable the cam 42 to control connection between slip rings 52 and 54 and thus between the fixed contacts 56 and 58. As these parts are identical with those just discussed in structure and arrangement it is not thought necessary to show or describe them.

Two limit switches 64 and 65 are mounted on the standard 24 in position to be actuated by adjustable members 66 and 67 respectively, mounted on the nut 21. A double, manual control switch 68, 69 is also shown as mounted on the standard 24 for convenience, although this switch may be located at any other convenient site. Two self-locking, four contact switches 70 and 71, actuated by solenoids 72 and 73 respectively, are located in any convenient site not shown in Fig. 1.

Figure 2:
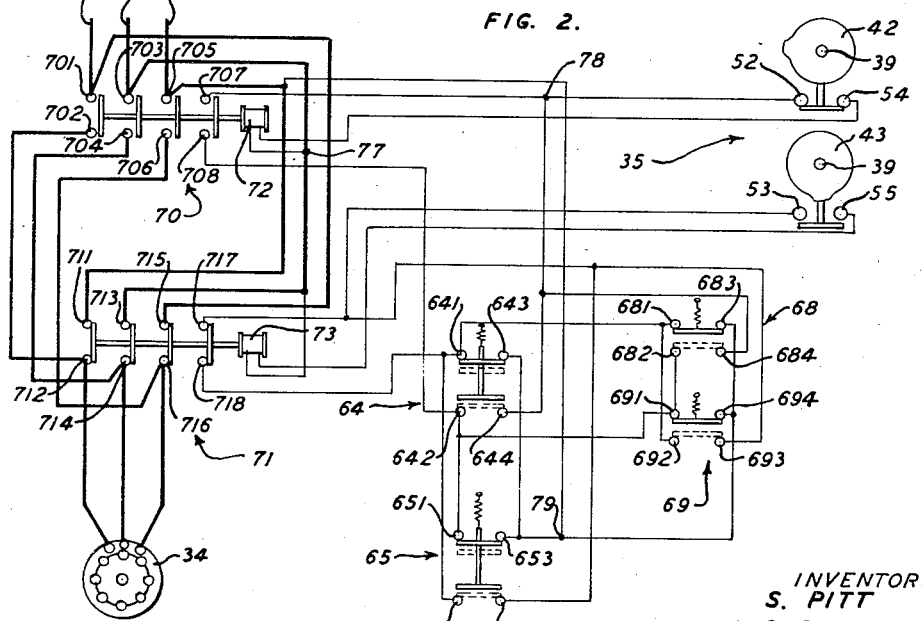
Fig. 2 is a wiring diagram for the apparatus of Fig. 1.

Assume now that the apparatus is in operation with the parts in the positions shown in Figs. 1 and 2 and with the nut 21 moving upwardly. The shaft 31 is rotating at all times clockwise, as seen from the left, at constant speed, and hence the disc 30 is rotating in the same direction at all times and at constant speed. The motor 34 is cut off from power since both switches 70 and 71 are open. Hence the shaft 33 and therefore the forked yoke 32 are stationary, and the disc 30 remains in the position shown. Hence the disc 30 drives the disc 29 and gear 27 at constant speed and counterclockwise, as seen from above. The gear 27, therefore, drives the gear 26 and shaft 22 clockwise at constant speed, and the screw shaft 22 drives the nut 21 and strand guide 20 upwards at constant speed, the thread on the shaft 22 being a right hand helix.

This state of affairs continues until the control member 66 on the nut shifts the switch 64 from the solid line position of Fig. 2 to the dotted line position. When this is done, a circuit is closed from the power supply main 75 through terminal 703, branch point 77, solenoid 72, terminals 54, 52, branch point 78, terminals 644, 642, terminals 651, 653, branch point 79, and up and back to terminal 705 and supply main 76, thus energizing solenoid 72 to close switch 70. Immediately this is done a second circuit through solenoid 72 is closed as follows: From 703 through 77, 72, 54, 52, 78, 707, 708, 642, 651, 653, 79 and up and back to 705. This second circuit is independent of the closure at 644, 642 and so keeps the solenoid 72 energized and the switch 70 closed even after the switch 64 is reversed as described below. However, both circuits to energize solenoid 72 depend upon closure at 52, 54 and are broken or held open whenever the cam 42 breaks the connection from 52 to 54.

The switch 70 having been thus closed, power flows from the mains 74, 75, 76 to the motor 34 and drives the latter counterclockwise as seen from the left in Fig. 1. Thereby the disc 30 is shifted to the right thus slowing, stopping and reversing the disc 29. Hence the nut 21 slows and stops its upward motion and begins to move steadily down again, thus releasing the switch 64 to spring back to the full line position of Fig. 2.

At the same time the motor 34 begins to drive the shaft 39 counterclockwise, as seen in Fig. 2, thus causing the cam 43 to allow closure at 53, 55 and after a predetermined interval (dependent upon the angular relations of the cams 42 and 43 as determined by previous adjustment with the knob 50) causing the connection at 52, 54 to be broken. Breaking this latter connection breaks the second circuit through solenoid 72 described above (the first having already been broken at 644, 642 by reversal of the switch 64) and the switch 70 opens, stopping the motor 34 and therefore the traversing motion of the disc 30. The device 35 stops, when the motor 34 stops, with the connection 52, 54 open and the connection 53, 55 closed.

The nut 21 then continues its steady motion down until the member 67 throws the switch 65. It is not thought necessary to trace out, in detail the chain of effects thus caused, as this is substantially like that just described except that the ultimate result is to restore the status shown in Fig. 2 with the nut 21 moving up at constant speed.

The general result is that the guide 22 is thus traversed in regular reciprocal motion without further attention so long as the shaft 31 is driven and the mains 74, 75, 76 are energized. The upper and lower limits of the excursion of the nut 21 can be adjusted by adjustment of the members 66 and 67, or by mounting the switches 64 and 65 adjustably on the standard 24. The speed of the nut 21 can be regulated by adjustment of the discs 50 and 51 by the knob 50 to vary the limit of excursion of the disc 30 along the shaft 31, the nearer the limit positions of the disc 30 on either side of the axis of the shaft 28 to that shaft, the more rapid being the normal motion of the nut between reversals.

Supposing that it be desired to wind a prescribed length of strand or cable on a reel, the chances are that the winding will be finished at some practically unpredeterminable fraction of a last layer of winding, and the whole machine will be stopped, to cut the strand and begin to wind another reel, with the nut 21 somewhere between its extreme positions. Closure of either switch 68 or switch 69 will then start the nut 21 toward its lower or upper limit of travel as may be desired. It is not thought necessary to describe these operations in detail, as switch 68 is electrically in parallel and interchangeable with switch 64 and switch 69 with switch 65.

In the embodiment disclosed in Fig. 5, a machine, whose nature is irrelevant here, is enclosed in a safety cage 129 which has a reciprocable heavy door 130 slidable arcuately over the surface of the cage. Here the motor 34 through its shaft 33 and suitable means such as gearing 132 is used to drive the door 130 up to open and down to close. The electrical connections are identical with those of Fig. 2 except that switches 64 and 65 and their connections are omitted.

Hence, with the parts in the position shown in Fig. 5, closing of the switch 69 energizes the motor as before to raise the door 130 until the device 35, driven by the motor, cuts the power supply to the motor after the latter has run for a predetermined number of revolutions, i. e. has raised the door a predetermined distance. Similarly, when the door is open closure of the switch 68 will cause the door to be brought back to its initial position.

In Fig. 6 is shown a wiring diagram for the embodiment of the invention disclosed in Fig. 5, modified to be operated with direct instead of alternating current. A D. C. motor 134 is substituted for the A. C. motor 34 of Fig. 5. A double throw, single pole switch 168, 164, 169 is shown replacing the former switch 68, 69. Two contact, solenoid controlled switches 170 and 171 replace the former four contact switches 70 and 71 and solenoid controlled circuit breakers 180 and 181 are added to the system as shown.

With the mechanical parts as shown in Fig. 5, i. e. with the door 130 down or closed, the electrical parts will be in the position shown in full lines in Fig. 6, and everything will be at rest. Reversal of the switch 168, 164, 169, will then cause the door to be opened and to come to rest in the open position. In the light of the description of the electrical system of Figs. 1 and 2 it is not believed to be necessary here to trace out in detail the active and inert circuits of Fig. 6 occasioned by reversal of the switch. The electrical operation will be obvious from the diagram of Fig. 6.

The apparatus of Figs. 1 and 2 is shown as employing the old and well known variable speed transmission comprising a pair of relatively slidable friction discs. This is the simplest such device for disclosure in a drawing. The invention, however, is not limited to the employment of this particular type of transmission. It may well employ any one of a variety of equivalent variable speed transmission devices which are suitable and well known, in which the speed range runs through zero and the speed is controlled by a member actuable by the motor 34 or 134.

Furthermore it will be evident to those skilled in the art, that while the device 35 is constructed to break the two circuits controlled by it at suitably adjustable points of its revolution, it could, by mechanical reversal of its contacts, be equally well constructed to make the said circuits at these positions.

The embodiments of the invention herein disclosed are illustrative only and can be modified and departed from in many ways without departing from the spirit and scope of the invention as pointed out in and limited solely by the appended claims.

What is claimed is:
1. In an apparatus having a reciprocable member and variable means to drive the member, means to control the motion of the member, comprising an electric motor to vary the variable driving means, means actuable by the member at predetermined positions to start the motor, and means actuated by the motor to stop the motor.

2. In an apparatus having a reciprocable member and means to drive the member adjustably variable as to speed of the member, an electric motor to vary the variable driving means, elements adjustably carried by the member to start the motor and adjustable relative to the member to vary the excursion of the member, and means actuated by the motor to vary the speed of the member.

3. In an apparatus having a reciprocable member and a constant speed driving means, means interposed between the member and the driving means to couple the member to the driving means and adjustably variable to vary the speed of the member, an electric motor to alter the adjustment of the coupling means, means actuable to start the motor during each reciprocating cycle of the member, and means actuated by the motor to stop the motor after a predetermined adjustment of the coupling means has been made.

4. In an apparatus having a reciprocable member and a constant speed driving means, means interposed between the member and the driving means to couple the member to the driving means and adjustably variable to vary the speed of the member, an electric motor to alter the adjustment of the coupling means, means actuable by the member to start the motor during each reciprocating cycle of the member, and means actuated by the motor to stop the motor after a predetermined adjustment of the coupling means has been made.

5. In an apparatus having a reciprocable member and a constant speed driving means, means interposed between the member and the driving means to couple the member to the driving means and adjustably variable to vary the speed of the member, an electric motor to alter the adjustment of the coupling means, means actuable to start the motor during each reciprocating cycle of the member, and adjustable means actuated by the motor to stop the motor after a predetermined adjustment of the coupling means has been made to vary the speed of the member.

6. In an apparatus having a reciprocable member and a constant speed driving means, means interposed between the member and the driving means to couple the member to the driving means and adjustably variable to vary the speed of the member, an electric motor to alter the adjustment of the coupling means, means actuable by the member to start the motor during each reciprocating cycle of the member, and adjustable means actuated by the motor to stop the motor after a predetermined adjustment of the coupling means has been made.

7. In an apparatus having a reciprocable member movable at variable speeds, variable means to move the member, an electric motor to vary the moving means to vary the speed of movement of the member, control means for the motor comprising means actuable to start the motor, and means to stop the motor including a rotary switch actuated by the motor to discontinue variation of the speed of movement of the member.

8. In an apparatus having a reciprocable member movable at variable speeds, variable means to move the member, an electric motor to vary the moving means to vary the speed of movement of the member, control means for the motor comprising means actuable to start the motor, and means to stop the motor including a rotary switch actuated by the motor and adjustable to stop the motor to discontinue variation of the speed of movement of the member after an adjustably predetermined number of revolutions thereof.

9. In an apparatus having a reciprocable member and a constant speed driving means, interposed means including associated elements to couple the member to the driving means to cause movement of the member, an electric motor to vary the relative association of the elements to vary the speed of movement of the member, means actuable to start the motor, means actuated by the motor to stop the motor, and means affected by the last named means to vary the direction of movement of the member.

10. In an apparatus having a reciprocable member and a constant speed driving means, interposed means including associated elements to couple the member to the driving means, an electric motor operatively connected to the elements, means to energize the motor at predetermined intervals to cause relative movement of the elements to change the direction of movement of the member, and means to vary the length of time of the energized intervals of the motor to vary the speed of the member.

11. In an apparatus having a reciprocable member movable at variable speeds, variable means to move the member, an electric motor to vary the moving means to vary the speed of movement of the member, an electrical circuit for the motor, and control means for the motor comprising a rotary cam driven by the motor and contact members included in the circuit and actuable by the cam to open the circuit to deenergize the motor to discontinue variation of the speed of movement of the member.

12. In an apparatus having a reciprocable member movable at variable speeds, variable means to move the member, an electric motor to vary the moving means to vary the speed of movement of the member, an electrical circuit for the motor, control means for the motor comprising a rotary cam driven by the motor and contact members included in the circuit and actuable by the cam and adjustable relatively to the cam to be actuated thereby only after an adjustably predetermined rotation of the cam to open the circuit to deenergize the motor to discontinue variation of the speed of movement of the member.

13. In an apparatus having a reciprocable member movable at variable speeds, variable means to move the member, an electric motor to vary the moving means to vary the speed of movement of the member, an electrical circuit for the motor, control means for the motor comprising a rotary adjustable support associated with a cam, and contact members included in the circuit and mounted on the support and actuable by the cam to open the circuit to deenergize the motor to discontinue variation of the speed of movement of the member.

14. In an apparatus having a reciprocable member movable at variable speeds, variable means to move the member, an electric motor to vary the moving means to vary the speed of movement of the member, electrical circuits for the motor, control means for the motor comprising a pair of rotary cams to be driven by the motor, a rotary support associated with each cam, and contact members included in the circuits mounted on each support and actuable by the associated cam to control the circuits to the motor, the contact members on one support being in one of the circuits for controlling the forward motion of the motor and the contact members on the other support being in another of the circuits for controlling the reverse motion of the motor.

15. In an apparatus having a reciprocable member movable at variable speeds, variable means to move the member, an electric motor to vary the moving means to vary the speed of movement of the member, electrical circuits for the motor, control means for the motor comprising a pair of rotary cams to be driven by the motor, a rotary support associated with each cam, and contact members included in the circuits mounted on each support and actuable by the associated cam to control the circuits to the motor, the contact members on one support being in one of the circuits for controlling the forward motion of the motor and the contact members on the other support being in another of the circuits for controlling the reverse motion of the motor, and the supports being rotarily adjustable to vary the positions of the two sets of contact members both with respect to the cams and with respect to each other.

SAMUEL PITT.
LESTER O. REICHELT.